United States Patent
Lucka

(10) Patent No.: US 9,694,419 B2
(45) Date of Patent: Jul. 4, 2017

(54) INJECTION MOLDING PRESSURE RELIEF AND ASSIST

(71) Applicant: Ford Motor Company, Dearborn, MI (US)

(72) Inventor: Kevin Lucka, Madison Heights, MI (US)

(73) Assignee: Ford Motor Company, Dearborn, MI (US)

( * ) Notice: Subject to any disclaimer, the term of this patent is extended or adjusted under 35 U.S.C. 154(b) by 204 days.

(21) Appl. No.: 14/804,702

(22) Filed: Jul. 21, 2015

(65) Prior Publication Data

US 2017/0021409 A1 Jan. 26, 2017

(51) Int. Cl.
| | |
|---|---|
| B22D 17/20 | (2006.01) |
| B22D 17/22 | (2006.01) |
| C03B 19/02 | (2006.01) |
| B29C 45/34 | (2006.01) |
| B29C 45/63 | (2006.01) |
| B29C 45/62 | (2006.01) |

(52) U.S. Cl.
CPC ......... *B22D 17/20* (2013.01); *B22D 17/2061* (2013.01); *B22D 17/22* (2013.01); *B29C 45/34* (2013.01); *B29C 45/63* (2013.01); *C03B 19/025* (2013.01); *B29C 45/62* (2013.01); *C03B 2215/71* (2013.01)

(58) Field of Classification Search
CPC ..... B22D 17/20; B22D 17/2061; B22D 17/22
See application file for complete search history.

(56) References Cited

U.S. PATENT DOCUMENTS

| | | |
|---|---|---|
| 5,044,926 A | 9/1991 | Dinerman et al. |
| 5,705,201 A | 1/1998 | Ibar |
| 5,919,492 A | 7/1999 | Tarr et al. |
| 2014/0127338 A1 | 5/2014 | Altonen et al. |
| 2014/0335219 A1 | 11/2014 | Altonen |

*Primary Examiner* — Kevin P Kerns
*Assistant Examiner* — Steven Ha
(74) *Attorney, Agent, or Firm* — Damian Porcari; Brooks Kushman P.C.

(57) ABSTRACT

An injection molding system and method of operating the system are disclosed. The system may include a hopper, a barrel configured to receive injection material from the hopper, a screw disposed within the barrel, and a mold defining a mold cavity configured to receive the injection material from the barrel. A pressure-balancing conduit may connect the mold cavity and a rear end of the barrel and be configured to allow air to flow from the mold cavity to the rear end of the barrel. A mold valve may be disposed between the pressure-balancing conduit and the mold cavity and a barrel valve may be disposed between the pressure-balancing conduit and the rear end of the barrel. The method may include opening the mold valve and injecting a material into the mold cavity from the barrel.

20 Claims, 1 Drawing Sheet

INJECTION MOLDING PRESSURE RELIEF AND ASSIST

TECHNICAL FIELD

The present disclosure relates to a method and system for assisting and relieving pressure in an injection molding process.

BACKGROUND

Injection molding is a manufacturing process for producing components by injecting molten material into a mold under pressure. Injection molding may be performed using a variety of materials, including thermoplastic and thermosetting polymers, elastomers, metals, glasses, or others. Generally, material for the component may be fed into a barrel, where it is heated and mixed and then forced into a mold cavity under pressure. The component may then cool and harden in the shape of the mold cavity. Injection molding is a very versatile and prevalent manufacturing process that can be used to form a wide variety of parts. However, molding defects during the injection molding process can lead to defective parts, increased waste, part re-design, or other problems.

SUMMARY

In at least one embodiment, an injection molding system is provided. The system may include a hopper, a barrel configured to receive injection material from the hopper, a screw disposed within the barrel, a mold defining a mold cavity configured to receive the injection material from the barrel, and a pressure-balancing conduit connecting the mold cavity and a rear end of the barrel and configured to allow air to flow from the mold cavity to the rear end of the barrel.

The system may further include a mold valve disposed between the pressure-balancing conduit and the mold cavity. The mold valve may be a one-way valve configured to only allow air to flow from the mold cavity into the pressure-balancing conduit. A channel may connect the mold cavity to the mold valve. The system may also include a barrel valve disposed between the pressure-balancing conduit and the rear end of the barrel. The barrel valve may be configured to allow air flow from the pressure-balancing conduit into the rear end of the barrel and to prevent air flow from the rear end of the barrel into the pressure-balancing conduit.

The system may include a pressure-release valve configured to vent air from the rear end of the barrel to the atmosphere. The barrel valve may be further configured to vent air from the rear end of the barrel to the atmosphere. In one embodiment, the barrel valve is configured to allow air to flow between the pressure-balancing conduit and the rear end of the barrel. A channel may connect the rear end of the barrel to the barrel valve.

In at least one embodiment, a method of injection molding is provided. The method may include opening a mold valve connecting an injection mold cavity and a pressure-balancing conduit. The pressure-balancing conduit may connect the mold cavity and a rear end of an injection molding barrel to allow air to flow from the mold cavity to the rear end of the barrel. The method further includes injecting a material into the mold cavity from the barrel.

In one embodiment, the method includes closing the mold valve prior to a completion of the injecting step. In another embodiment, the method includes maintaining the mold valve in an open position until the injection step is complete. The method may include opening a barrel valve connecting the pressure-balancing conduit to the rear end of the injection molding barrel to allow air to flow from the mold cavity to the rear end of the barrel.

The injecting step may include moving a screw axially toward the mold and away from the rear end of the barrel and, after the completion of the injection step, the screw is moved axially away from the mold and toward the rear end of the barrel in a reset step. The barrel valve may be held open during the injecting step and closed during the reset step such that air from the barrel cannot enter the pressure-balancing conduit during the reset step. Pressure generated above a pre-determined level in the rear end of the barrel during the reset step may be vented by a pressure-release valve. The barrel valve may be held open during the injecting step and open during the reset step such that air from the barrel can enter the pressure-balancing conduit during the reset step.

In at least one embodiment, an injection molding system is provided. The system may include a barrel configured to receive injection material, a screw disposed within the barrel, a mold defining a mold cavity configured to receive the injection material from the barrel, a pressure-balancing conduit fluidly connecting the mold cavity and a rear end of the barrel, and a mold valve disposed between the pressure-balancing conduit and the mold cavity. In one embodiment, a barrel valve may be disposed between the pressure-balancing conduit and the rear end of the barrel.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As described above, injection molding is a manufacturing process for producing components by injecting molten material into a mold under pressure. Generally, material for the component, such as a polymer (e.g., thermoplastic) may be fed into a barrel. In the barrel, it is heated and mixed, for example using a screw, and then forced into a mold cavity under pressure. The heated polymer may be forced into the mold cavity by moving the screw forward in the barrel (e.g., reciprocating screw) or by other methods, such as a ram. Injection molding systems and their various designs and methods of operation are known in the art and will not be described in detail. The disclosed method and system for assisting and relieving/balancing pressure in an injection molding process may be applied to any injection molding system or process.

Figure 1:
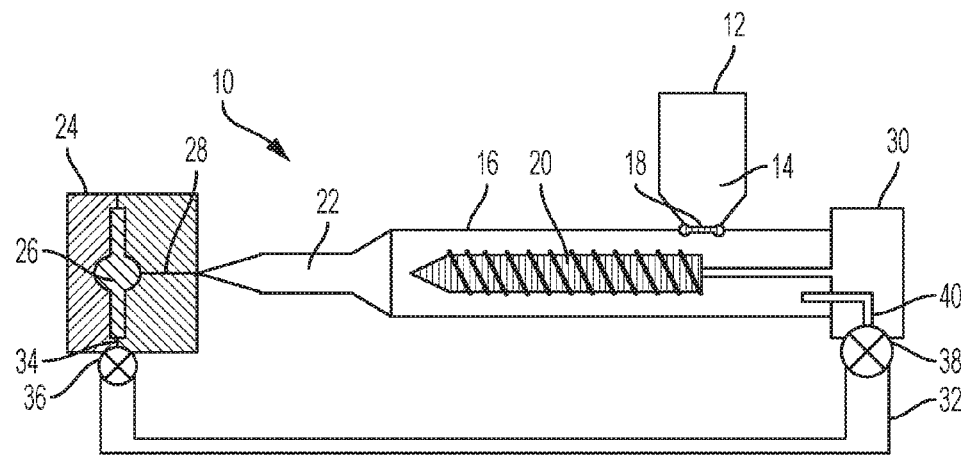
FIG. 1 is a schematic of a pressure-relieving/balancing injection molding system, according to an embodiment.

With reference to FIG. 1, an injection molding system 10 is shown. The system 10 may include a hopper 12 for storing a material 14 to be molded. The material 14 may be an injection-moldable material, such as a polymer (e.g., thermoplastic or thermoset), elastomers, metals, glasses, or others. The material 14 may be in the form of pellets, although any suitable form may be used. The system includes a barrel 16, which may receive the material 14 from the hopper 12. For example, the material 14 may enter the barrel 16 from the hopper 12 through a valve or gate 18. The gate 18 may be unidirectional or one-way, such that material can only flow from the hopper 12 into the barrel 16, and not vice versa. The gate may be operated or controlled manually or by a controller (not shown).

A screw 20 may be located within the barrel 16 to heat and mix the material 14. The screw 20 may be a reciprocating screw that is configured to rotate and also move forward and backward in the axial direction. The screw 20 may rotate (e.g., counter-clockwise) to move the material 14 towards the front of the barrel 16. The screw 20 may be rotated and/or moved axially forward and backward by a motor located in a motor housing 30. The rotation of the screw 20 may mix and provide a shearing action on the material 14 (e.g., pellets), which creates frictional heat that heats and melts the material 14. As the material 14 moves towards the front of the barrel 16, it may accumulate at the tip 22 of the barrel and begin to push the screw 20 towards the back of the barrel 16. Once a certain volume of quantity of material 14 has accumulated at the tip 22, for example a "shot" (the amount needed for one molding cycle), the molten material 14 may be forced into a mold 24 under pressure. Generally, the molten material 14 may be forced into the mold 24 by moving the screw 20 forward. This may be accomplished using any suitable means, such as hydraulics, pneumatics, mechanical force, or others. However, any suitable method or equipment may be used to force the material 14 in to the mold 24, for example, a ram.

The mold 24 forms a mold cavity 26 corresponding to the desired shape of the part to be molded (which may contain some extraneous material to be removed). The mold cavity 26 may be formed from two or more mold pieces that are held or clamped together. One or more of the mold pieces may include one or more channels 28, known as sprues, that receive the molten material 14 from the barrel 16 and transfer it to the mold cavity 26. Depending on the complexity and/or number of the part(s) to be formed, the channels 28 may include additional portions known as runners and gates. For simplicity, a single channel 28 is shown in FIG. 1, however, it should be understood that there may be multiple channels 28 that may each include one or more portions such as sprues, runners, and/or gates.

At the beginning of each injection cycle, the cavity 26 may be filled with air. The gate 18 is opened and material 14 is transferred into the barrel 16 and the screw 20 begins to mix and heat the material 14. Once a sufficient amount of molten material 14 is located at the tip 22 of the barrel 16 (e.g., a shot), the screw 20 may be moved forward to inject the material into the mold cavity 26 (e.g., through a one-way valve, not shown). When the material 14 enters the mold cavity 26, it displaces and/or compresses the air present in the cavity 26. If the air is not released or the pressure relieved, defects may occur in the molded component. For example, there may be "short shot" defects, in which the mold cavity is not completely filled and the part is missing material because the air prevented sufficient material to enter the mold cavity 26.

In an attempt the alleviate these problems, some molds 24 have been provided with release or blow-off valves that vent the air in the mold to the atmosphere, thereby allowing the mold cavity 26 to be more completely filled. However, it has been discovered that in addition to the air that was initially in the mold cavity 26, additional air pressure is also generated in the front of the barrel 16, the nozzle, and the mold cavity 26 by the rotating screw 20 moving the material 14 towards the mold 24. As a result, a low pressure zone or partial vacuum is generated in the back or rear end of the barrel 16 and/or in the hopper 12. One-way pressure relief valves in the mold cavity 26 have no impact on these low pressure zones.

With reference to FIG. 1, the disclosed system 10 may alleviate the increased pressure (e.g., high pressure zone) in the mold cavity 26 while also alleviating the low pressure zone in the back end of the barrel 16. The system 10 may also maintain a relatively constant air pressure within the barrel 16 and mold cavity 26 during the injection molding process. In at least one embodiment, the system 10 includes a pressure-relief or pressure-balancing conduit 32 that fluidly connects the mold cavity 26 to the back or rear end of the barrel 16 and/or the hopper 12. The conduit 32 may have any suitable form, such as a pipe, tube, or duct, and may be rigid or flexible. The mold 24 may include a channel 34 that connects the mold cavity 26 to the conduit 32, thereby allowing air from the mold cavity 26 to flow into the conduit 32. A mold valve 36, which may be a one-way valve, may control the flow of air between the mold cavity 26 and the conduit 32. If the valve 36 is a one-way valve, then it may only allow air to flow from the mold cavity 26 into the conduit 32, and not vice-versa. The mold valve 36 may be disposed between the conduit 32 and the channel 34. The mold valve 36 may include any suitable type of valve capable of providing one-way air flow from the mold cavity 26 to the conduit 32. Examples of valve types that may be used for mold valve 36 may include knife, gate, check, poppet, ball, choke, diaphragm, globe, needle, pinch, piston, spool, sampling, and safety valves. However, these examples are non-limiting, and other types of valves could also be used, such as butterfly, ceramic disc, plug, thermal expansion, and pressure reducing valves.

A channel 40 may connect the conduit 32 to the back end of the barrel 16. A barrel valve 38 may control the flow of air between the conduit 32 and the back end of the barrel 16. The barrel valve 38 may be two-way or one-way. The barrel valve 38 may include any suitable type of valve capable of providing the disclosed air flow between the conduit 32 and the rear end of the barrel 16. Non-limiting examples of valve types that may be used for barrel valve 38 may include knife, gate, check, poppet, ball, choke, diaphragm, globe, needle, pinch, piston, spool, sampling, and safety valves. However, these examples are non-limiting, and other types of valves could also be used, such as butterfly, ceramic disc, plug, thermal expansion, and pressure reducing valves.

If the barrel valve 38 is one-way, it may only allow air to flow from the conduit 32 to the back end of the barrel 16. The barrel valve 38 may be disposed between the conduit 32 and the channel 40. The barrel valve 38 may also allow venting to the atmosphere, in addition to or instead of allowing air to flow between the conduit 32 and the barrel 16. Alternatively, a separate valve may be provided that vents to the atmosphere (e.g., in the conduit 32 or the channel 40). As described herein, the back of the barrel 16 may include a space behind the screw 20, behind the hopper 12, or a certain distance from the back of the screw 20 (e.g., back third). Accordingly, the channel 40 may connect to the back of the barrel 16 behind the screw 20, behind the hopper 12, or somewhere behind the front two-thirds of the screw 20. The channel 40 may extend through at least a portion of the motor housing 30 or it may extend external to the system 10.

While the system 10 is shown in FIG. 1 with a single conduit 32, channel 34, mold valve 36, barrel valve 38, and channel 40, there may be a plurality of any or all of these elements depending on the configuration of the system 10, the size/shape/geometry of the mold 24, or other factors. For example, if the mold 24 is complex and/or large, there may be multiple channels 34 for allowing air to escape the mold cavity 26. Each channel 34 may have a corresponding mold valve 36 connecting the channel 34 to the conduit 32. Alternatively, if there are multiple channels 34 and mold valves 36, there may be a plurality of conduits 32 (e.g., one for each channel/valve). In another embodiment, two or more channels may combine prior to a mold valve 36 such that there are less valves 36 than channels 34. Similarly, if there are multiple conduits 32, they may combine into fewer or a single conduit 32 downstream (e.g., away from) the mold 24. While several configurations are disclosed, one of ordinary skill in the art will appreciate that different combinations of conduits 32, channels 34, and mold valves 36 may be used to carry out the disclosed air/pressure balancing. Similar to the channels, valves, and conduits near the mold 24, there may be multiple barrel valves 38 and/or channels 40 connecting to the rear end of the barrel 16. As above, each valve 38 may have a corresponding channel 40 or a single valve may correspond to multiple channels 40. The conduit(s) 32 may split or combine to associate with a single barrel valve 38 or multiple. If there are multiple channels 40, they may enter the barrel 16 at substantially the same location or may be dispersed around the rear end of the barrel 16 (e.g., spaced at regular intervals). Some or all of the channels 40 may extend through the housing 30 or some or all may extend external to the barrel 16, or any combination thereof.

Accordingly, by providing a fluid connection between the mold cavity 26 and the back of the barrel 16, the high pressure zone that typically occurs in the mold cavity may be relieved or avoided by allowing air to flow from the cavity 26 to the conduit 32 and into the back of the barrel 16. The air that flows from the mold cavity 26 into the back of the barrel 16 may therefore also alleviate or avoid the formation of a low pressure zone in the back of the barrel 16. The conduit 32 may therefore provide the system 10 with a closed-loop of air flow that balances the pressure within the mold 24 and the barrel 16 during the injection process. This may reduce or eliminate defects associated with air pressure or build-up in the mold cavity, such as short shots.

The gates and valves 18, 36, and 38 may be controlled manually or by a controller (not shown). At the start of the injection molding cycle (e.g., mold 24 is empty), the gate 18 may open to allow material 14 (e.g., polymer pellets) to flow into the barrel 16. In one embodiment, the valve 36 may be open at the start of a new injection molding cycle or opened prior to the beginning of the injection step. As described above, the screw 20 may heat and mix the material 14 while also moving it towards the front of the barrel 16. Once a full shot of material 14 is formed at the front of the barrel, it may be injected into the mold cavity (e.g., by moving the screw axially forward). With the valve 36 open, air from the mold cavity 26 (whether there originally or pushed into the cavity 26 by the material 14) may be allowed to flow into the conduit 32 via the channel 34.

To avoid material 14 entering the conduit 32, the valve 36 may be closed at a certain point during the injection step (e.g., fill step). The valve 36 may be closed based on, for example, a certain amount of time passing or a certain percentage of the injection process being completed (e.g., mold cavity is a certain % full or a certain % of the shot has been injected from the barrel). In one embodiment, the valve 36 may close when the injection step is at least half or 50% completed (either by time or amount of shot injected). In another embodiment, the valve 36 may close when the injection step is at least 75% completed. For example, if an injection step has a fill time of 10 seconds, the valve 36 may be closed at 5 seconds or later or 7.5 seconds later, respectively. Similarly, for a shot size of, for example, 100 grams, the valve 36 may be closed when at least 50 grams or at least 75 grams of the shot have been injected, respectively.

While the material 14 is being heated and mixed and subsequently injected into the mold cavity 26, the valve 38 may be open to allow air from the mold cavity 26 to flow into the conduit 32 and into the back of the barrel 16. This air flow may alleviate the low pressure zone that typically builds up during the injection process. When the injection step is complete and the screw 20 is moved backward to its initial position, the air that was transported to the back of the barrel 16 may be pushed backwards and pressurized. To avoid or reduce a pressure build-up, the valve 38 may remain open and allow the air to flow back into the conduit 32 (and into the mold cavity 26 if valve 36 is open). Alternatively, the valve 38 may close-off the conduit 32 and allow the air to be vented to the atmosphere. Venting to the atmosphere may be performed by the valve 38 or a separate valve (not shown). If the valve 38 allows the air to be pushed back into the conduit 32, the conduit and valves 36 and 38 may be formed of suitable materials and configured to handle the pressure created by the air.

Figure 2:
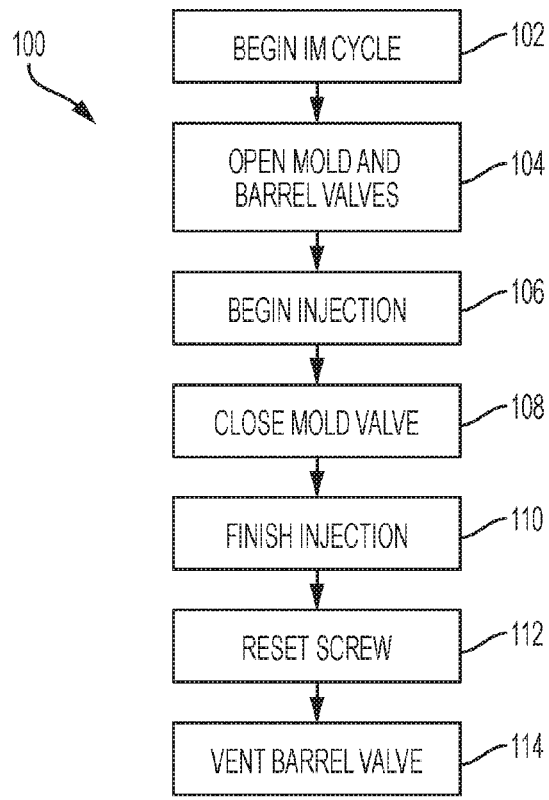
FIG. 2 is a flowchart for operating a pressure-relieving/balancing injection molding system, according to an embodiment.

With reference to FIG. 2, an example of a flowchart 100 is shown for operating system 10. While the steps are shown in a linear order, some steps may occur simultaneously or in an order different than shown. In step 102, the injection molding (IM) cycle may be started. This may be a first injection cycle for a batch of parts or may be a subsequent cycle after the system has been reset from a previous injection. Step 102 may include opening a gate from a hopper to allow material (e.g., thermoplastic pellets) into the barrel of the system and initiating rotating of the screw.

In step 104, the mold valve and barrel valves may be opened (if previously closed) or maintained in an open position (if previously open). Step 104 may occur after step 102, simultaneous with step 102, or even prior to step 102. Opening the mold and barrel valves may allow air to flow from the mold cavity to the back of the barrel, thereby reducing pressure in the mold cavity and balancing the pressure in the barrel.

In step 106, the injection process may begin once a full shot of material is ready. The injection step may include the screw being urged forward in the barrel (e.g., via hydraulics) to force the molten material into the mold cavity under pressure. However, as described above, any type of injection molding system may be used with the disclosed pressure balancing system and methods. For example, the injection step could include the use of a ram or piston instead of a screw. During the beginning of the injection step 106, the mold valve may remain open to allow air from the mold cavity to flow into the conduit and back of the barrel.

In step 108, the mold valve may be closed at a point prior to the completion of the injection step. The mold valve may be closed based on a certain amount of time passing, a certain percentage of the injection process being completed, or other parameters. For example, the valve may close when the injection step is at least half or 50% completed, at least 75% completed, at least 90% completed, or at other levels of completion (either by time or amount of shot injected). Closing the mold valve may prevent material from the mold cavity from entering the conduit. If material were to enter the conduit there may be several problems, including there being insufficient material to complete the part (e.g., short shot) and the material potentially obstructing of clogging the conduit for future cycles.

In another embodiment, the mold valve may be maintained open until the injection is complete. The mold valve may be closed when the injection is complete (e.g., closed simultaneously or substantially simultaneously with the completion of injection) or may be maintained open after the injection has finished. In these embodiments, measures may be taken to prevent the injection material from entering or clogging/plugging the pressure-balancing conduit. For example, the injection pressure and/or the shot size may be calibrated to prevent material from entering the conduit. Other measures could include the size or geometry of the channel(s) from the mold to the mold valve, which may prevent material from entering the conduit (e.g., by being long, narrow, and/or having a tortuous path).

In step 110, the injection step may be finished (e.g., the full shot of material is injected). During the completion of the injection and the associated steps, such as maintaining pressure on the mold, cooling, and ejection of the part, the mold valve may remain closed and the barrel valve may remain open. However, the mold valve may be opened once the material has solidified, since there would be no risk of molten material entering the conduit.

In step 112, the screw (or alternate injection element) may be reset to its initial position. This may occur before step 110 is completely finished, for example, during cooling or ejection of the part. When the screw is reset, air that was introduced into the barrel behind the screw during injection may be compressed.

In step 114, to avoid building up pressure in the barrel, the barrel valve may be opened/vented in both directions in order to allow air to flow back into the conduit (and into the mold cavity, if empty and the mold valve is two-way). Alternatively, the barrel valve may vent the excess pressure to the atmosphere. In another embodiment, there may be a separate valve that vents the pressure in the barrel to the atmosphere instead of, or in addition to, the barrel valve. Step 114 may occur simultaneously with step 112, or evenly slightly before it, to avoid any significant build-up of pressure.

Accordingly, the system 10 may balance the pressure therein during the injection molding cycle by allowing high pressure air from the mold cavity 26 to be transferred to the low pressure zone in the back of the barrel during the heating/mixing and injections steps. The air may be transferred via a conduit 32 that connects the mold cavity 26 and the back of the barrel 16. The conduit 32 therefore solves or mitigates two pressure issues—high pressure in the mold cavity and low pressure in the back of the barrel. The maintaining of relatively stable pressure in the system 10 may reduce or eliminate molding defects associated with air pressure, such as short shots.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An injection molding system comprising:
   a hopper;
   a barrel configured to receive injection material from the hopper;
   a screw disposed within the barrel;
   a mold defining a mold cavity configured to receive the injection material from the barrel; and
   a pressure-balancing conduit connecting the mold cavity and a rear end of the barrel and configured to allow air to flow from the mold cavity to the rear end of the barrel;
   wherein the pressure-balancing conduit is external to the barrel and the mold cavity.

2. The system of claim 1, further comprising a mold valve disposed between the pressure-balancing conduit and the mold cavity.

3. The system of claim 2, wherein the mold valve is a one-way valve configured to only allow air to flow from the mold cavity into the pressure-balancing conduit.

4. The system of claim 2, wherein a channel connects the mold cavity to the mold valve.

5. The system of claim 1, further comprising a barrel valve disposed between the pressure-balancing conduit and the rear end of the barrel.

6. The system of claim 5, wherein the barrel valve is configured to allow air flow from the pressure-balancing conduit into the rear end of the barrel and to prevent air flow from the rear end of the barrel into the pressure-balancing conduit.

7. The system of claim 6, further comprising a pressure-release valve configured to vent air from the rear end of the barrel to the atmosphere.

8. The system of claim 6, wherein the barrel valve is further configured to vent air from the rear end of the barrel to the atmosphere.

9. The system of claim 5, wherein the barrel valve is configured to allow air to flow between the pressure-balancing conduit and the rear end of the barrel.

10. The system of claim 5, wherein a channel connects the rear end of the barrel to the barrel valve.

11. A method of injection molding comprising:
    opening a mold valve connecting an injection mold cavity and a pressure-balancing conduit connecting the mold cavity and a rear end of an injection molding barrel to allow air to flow from the mold cavity to the rear end of the barrel; and
    injecting a material into the mold cavity from the barrel;
    wherein the pressure-balancing conduit is external to the barrel and the mold cavity.

12. The method of claim 11, further comprising closing the mold valve prior to a completion of the injecting step.

13. The method of claim 11, further comprising maintaining the mold valve in an open position until the injection step is complete.

14. The method of claim 11, further comprising opening a barrel valve connecting the pressure-balancing conduit to the rear end of the injection molding barrel to allow air to flow from the mold cavity to the rear end of the barrel.

15. The method of claim 14, wherein the injecting step includes moving a screw axially toward the mold and away from the rear end of the barrel; and after the injection step is complete, the screw is moved axially away from the mold and toward the rear end of the barrel in a reset step.

16. The method of claim 15, wherein the barrel valve is held open during the injecting step and is closed during the reset step such that air from the barrel cannot enter the pressure-balancing conduit during the reset step.

17. The method of claim 16, wherein pressure generated above a pre-determined level in the rear end of the barrel during the reset step is vented by a pressure-release valve.

18. The method of claim 15, wherein the barrel valve is held open during the injecting step and is open during the reset step such that air from the barrel can enter the pressure-balancing conduit during the reset step.

19. An injection molding system comprising:
   a barrel configured to receive injection material;
   a screw disposed within the barrel;
   a mold defining a mold cavity configured to receive the injection material from the barrel;
   a pressure-balancing conduit external to the barrel and the mold cavity and fluidly connecting the mold cavity and a rear end of the barrel; and
   a mold valve disposed between the pressure-balancing conduit and the mold cavity.

20. The system of claim 19, further comprising a barrel valve disposed between the pressure-balancing conduit and the rear end of the barrel.

* * * * *